United States Patent [19]
Wood

[11] Patent Number: 6,142,784
[45] Date of Patent: Nov. 7, 2000

[54] MATHEMATICAL LEARNING GAME AND METHOD

[75] Inventor: Michael C. Wood, Orinda, Calif.

[73] Assignee: Knowledge Kids Enterprises, Inc., Emeryville, Calif.

[21] Appl. No.: 09/094,898

[22] Filed: Jun. 15, 1998

[51] Int. Cl.⁷ .................................................. G09B 5/00
[52] U.S. Cl. ...................... 434/201; 434/188; 434/206; 446/397
[58] Field of Search ..................................... 434/188, 206, 434/308, 191, 201, 197, 209, 307 R, 323, 362, 365; 446/321, 397; 708/142; 704/231, 243

[56] References Cited

U.S. PATENT DOCUMENTS

| | | |
|---|---|---|
| 2,476,580 | 7/1949 | Bergman . |
| 2,643,467 | 6/1953 | Goodwin . |
| 3,925,909 | 12/1975 | Duncan . |
| 3,947,976 | 4/1976 | Hafel ........................................ 434/201 |
| 4,016,411 | 4/1977 | Genin ....................................... 708/142 |
| 4,051,605 | 10/1977 | Toal et al. ................................ 434/201 |
| 4,368,381 | 1/1983 | Ishiyama . |
| 4,468,203 | 8/1984 | Gimmestad et al. .................... 434/228 |
| 4,959,017 | 9/1990 | Thompson et al. ................. 434/201 X |
| 5,007,840 | 4/1991 | Gaskell .................................... 434/206 |
| 5,135,398 | 8/1992 | Thornton et al. ....................... 434/201 |
| 5,346,399 | 9/1994 | Sakow . |
| 5,408,582 | 4/1995 | Colier ...................................... 704/243 |
| 5,674,075 | 10/1997 | Sherman ............................. 434/209 X |
| 5,674,076 | 10/1997 | Billings et al. ......................... 434/365 |

Primary Examiner—Joe H. Cheng
Attorney, Agent, or Firm—Coudert Brothers

[57] ABSTRACT

The present invention comprises an electronic learning game that provides a plurality of pedagogical and instructional modalities which combine strong kinesthetic, auditory, and visual stimulation to assist a child to learn basic arithmetical concepts. The inventive game utilizes a combination of voice statements, rhythmic music, a visual display, and manual inputs from number dials and a response switch to achieve multi-modal learning or arithmetic concepts. The ergonometric size and structure of the present invention promotes a strong kinesthetic learning modality.

35 Claims, 14 Drawing Sheets

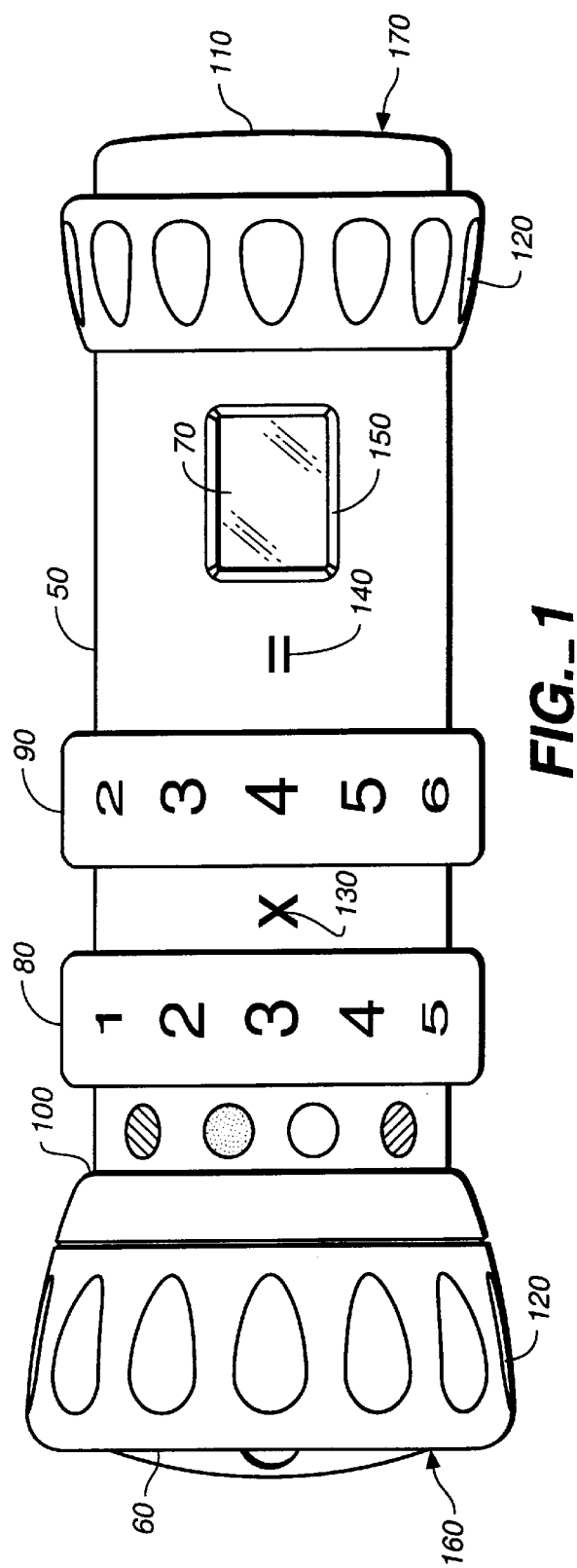
FIG._1
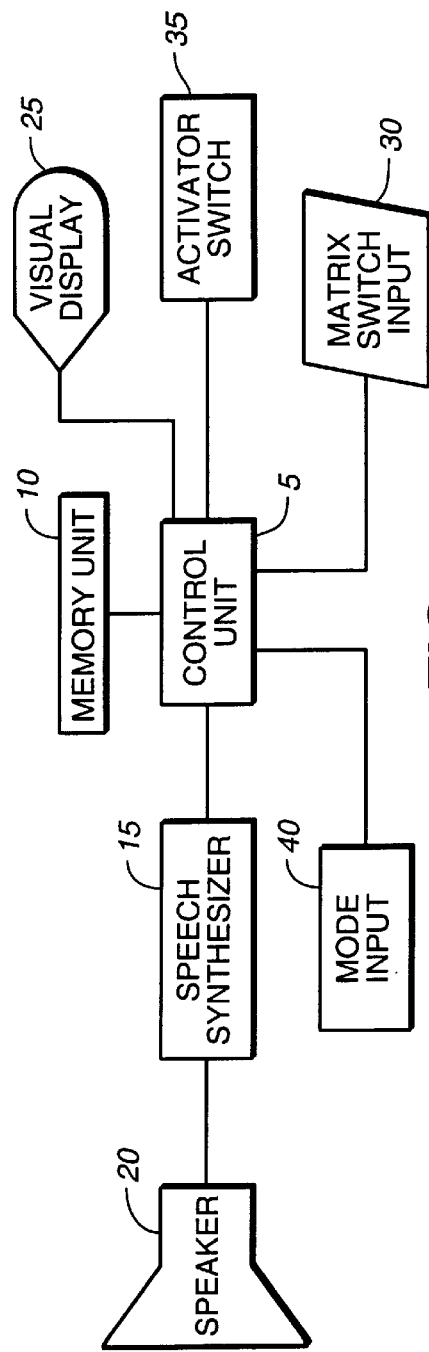
FIG._2

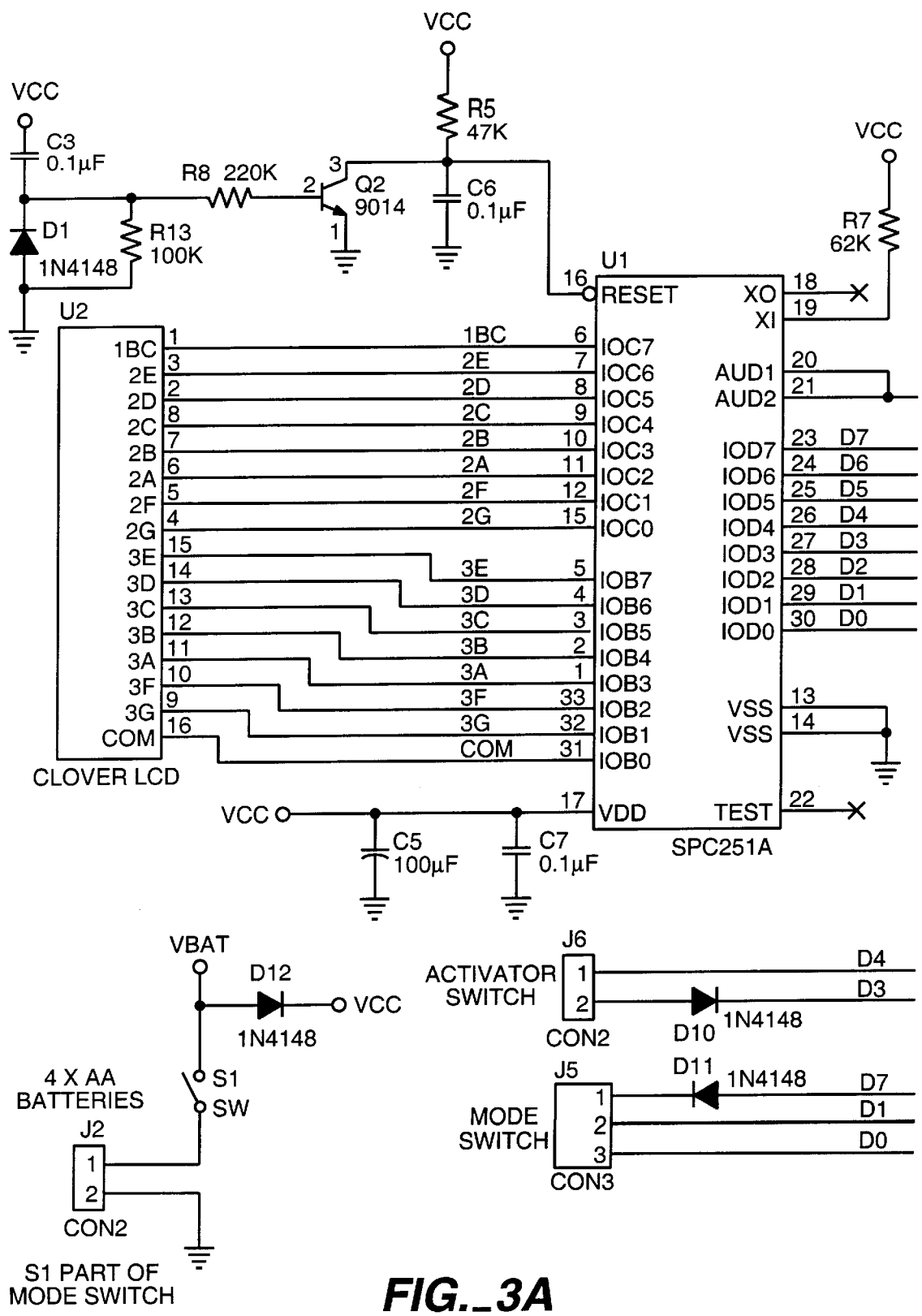
FIG._3A

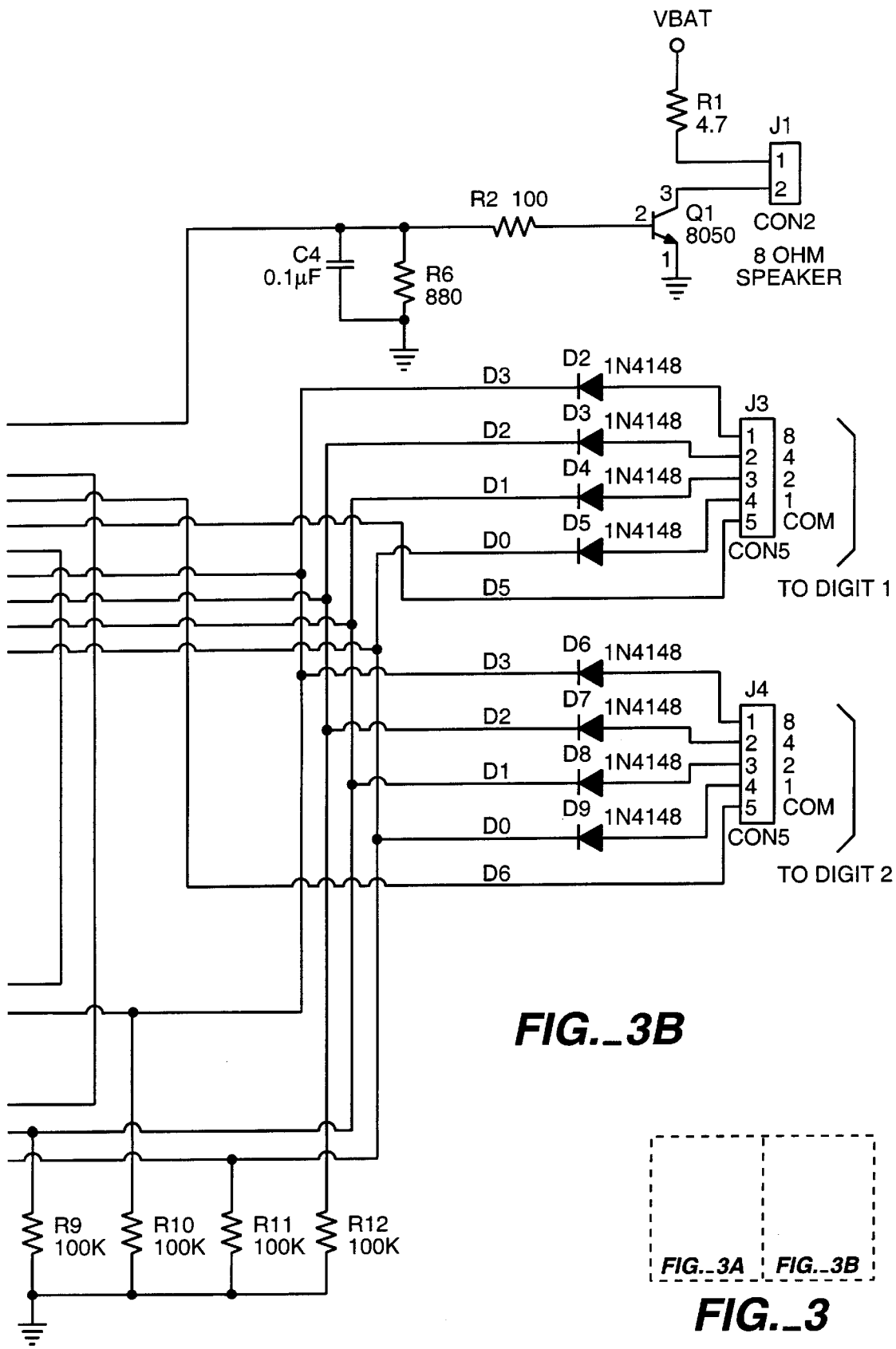
FIG._3B
FIG._3

FIG._4A

| FUNCTIONAL DIAL | # DIAL 1 | # DIAL 2 | AUDIO | LCD |
|---|---|---|---|---|
| OFF | Any # 0-12 or lightning | Any # 0-12 or lightning | None | Blank |
| Teach mode chosen | Any # 0-12 or lightning | Any # 0-12 or lightning | Learn It! (Looping beat in background). | Bottom segment of the character furthest right blinks |
| No activity for 3 seconds | Any # 0-12 | Any # 0-12 | Hi It! (Looping beat in background). | Bottom segment of the character furthest right blinks |
| No activity for another 3 seconds | Any # 0-12 | Any # 0-12 | Hit It! (Looping beat in background). | Bottom segment of the character furthest right blinks |
| No activity for another 3 seconds | Any # 0-12 | Any # 0-12 | Hit It or miss it! (Looping beat in background). | Bottom segment of the character furthest right blinks |
| No activity for another 3 seconds | Any # 0-12 | Any # 0-12 | Auto shutoff | Blank |
| Activator is hit before auto-shut-off | 2 (Any # 0-12) | 4 (Any # 0-12) | 2 (# on deal 1) ** times<br>4 (# on dial 2) **<br>is 8 *** | 2<br>nothing<br>4<br>nothing<br>8 |
| (Must bang) Continuously cycle through the 13x13 consecutive equations on the beat every time "banger" is hit. | Lightning<br>Start @ 1 x<br>Say @ 1 x | lightning<br>Start @ 1 x<br>then 2<br>then 3 | 2 (random #) **<br>times<br>4 (random #) **<br>is<br>8 **<br>Next equation after the beat | 2<br>nothing<br>4<br>nothing<br>8 |

FIG._4B

| FUNCTIONAL DIAL | # DIAL 1 | # DIAL 2 | AUDIO | LCD |
|---|---|---|---|---|
| (Must bang) Continuously cycle through the 13 consecutive equations on the beat. | 2 (Any # 0-12) | lightning x 0 x 1 x 2 x 3.... | 2 (# on dial 1) ** times 4 (random #) ** is 8 ** Next equation after the beat | 2 nothing 4 nothing 8 |
| (Must bang) Continuously cycle through the 13 consecutive equations on the beat. | Lightning 0 x 1 x 2 x 3 x... | 4 (Any # 0-12) | 2 (random #) ** times 4 (# on dial 2) ** is 8 ** Next equation after the beat | 2 nothing 4 nothing 8 |
| After 3 seconds of non-activity loops back to beginning | Any # 0-12 or lightning | Any # 0-12 or lightning | Hit It! (Looping beat in background) | Bottom segment of the character furthest right blinks |
| Quiz mode chosen | Any # 0-12 or lightning | Any # 0-12 or lightning | Quiz time! (Looping beat in background). | Bottom segment of the character furthest right blinks. |
| No activity for 3 seconds | Any # 0-12 or lightning | Any # 0-12 or lightning | Hit It! (Looping beat in background). | Bottom segment of the character furthest right blinks. |
| No activity for another 3 seconds | Any # 0-12 or lightning | Any # 0-12 or lightning | Hit It! (Looping beat in background). | Bottom segment of the character furthest right blinks. |
| No activity for 3 seconds | Any # 0-12 or lightning | Any # 0-12 or lightning | Hit It! (Looping beat in background). | Bottom segment of the character furthest right blinks. |
| No activity for 3 seconds | Any # 0-12 or lightning | Any # 0-12 or lightning | Auto shutoff | nothing |

FIG._4C

| FUNCTIONAL DIAL | # DIAL 1 | # DIAL 2 | AUDIO | LCD |
|---|---|---|---|---|
| Activator is hit before auto-shut-off | 2 (Any # 0-12) | 4 (Any # 0-12) | 2 (# on dial 1) ** times<br>4 (# on dial 2) **<br>is 4 **<br>is 6 **<br>is 8 ** | 2<br>nothing<br>4<br>4 blinks for 2 beats<br>6 blinks for 2 beats<br>8 blinks for 2 beats |
| Activator is hit after correct | 2 (Any # 0-12) | 4 (Any # 0-12) | (Jackpot sound) "Yeah!" | 8 stops blinks |
| Activator is hit after first incorrect answer | 2 (Any # 0-12) | 4 (Any # 0-12) | (Police Siren)<br>or (Buzzer sound) "Try again!"<br>2 (# on dial 1)** times<br>4 (# on dial 2) **<br>is 4 **<br>is 6 **<br>is 8 ** | nothing<br>nothing<br>2<br>nothing<br>4<br>4 blinks for 2 beats<br>6 blinks for 2 beats<br>8 blinks for 2 beats |
| Activator is hit after second incorrect answer | 2 (any # 0-12) | 4 (Any # 0-12) | (Police Siren)<br>or (Buzzer sound) "Lemme teach ya!"<br>2 (# on dial 1)** times<br>4 (# on dial 2) **<br>is 4 **<br>is 6 **<br>is 8 ** | nothing<br>nothing<br>2<br>nothing<br>4<br>nothing<br>8 |
| Activator is not hit within 2 beats after last possible answer | 2 (Any # 0-12) | 4 (Any # 0-12) | Hit it when you hear the right answer!<br>2 (# on dial 1) ** times<br>4 (# on dial 2) **<br>is 4 **<br>is 6 **<br>is 8 ** | nothing<br>2 (# on dial 1) ** times<br>4 (random #0-12) **<br>4 blinks for 2 beats<br>6 blinks for 2 beats<br>8 blinks for 2 beats |

| FUNCTIONAL DIAL | # DIAL 1 | # DIAL 2 | AUDIO | LCD |
|---|---|---|---|---|
| Activator is hit before auto-shut-off | 2 (Any # 0-12) | lightning | (Medium level lightning sound.)<br>2 (# on dial 1) **<br>times<br>4 (random # 0-12) **<br>is 4 **<br>is 6 **<br>is 8 ** | nothing<br>2 (# on dial 1) **<br>times<br>4 (random # 0-12) **<br>4 blinks for 2 beats<br>6 blinks for 2 beats<br>8 blinks for 2 beats |
| Activator is hit after correct answer. | 2 (Any # 0-12) | lightning | (Jackpot sound) "Yeah" | 8 stops blinking |
| Activator is hit after first incorrect answer | 2 (Any # 0-12) | lightning | (Police Siren)<br>or (Buzzer sound) "Try again!"<br>2 (# on dial 1) **<br>times<br>4 (random # 0-12) **<br>is 4 **<br>is 6 **<br>is 8 ** | nothing<br>nothing<br>2<br>nothing<br>4<br>4 blinks for 2 beats<br>6 blinks for 2 beats<br>8 blinks for 2 beats |
| Activator is hit after second incorrect answer | 2 (Any # 0-12) | lightning | (Police Siren)<br>or (Buzzer sound) "Lemme teach ya!"<br>2 (# on dial 1) **<br>times<br>4 (random # 0-12) **<br>is 4 **<br>is 6 **<br>is 8 ** | nothing<br>nothing<br>2<br>nothing<br>4<br>nothing<br>8 |
| Activator is not hit within 2 beats after last possible answer | 2 (Any # 0-12) | lightning | Hit it when you hear the right answer!<br>2 (# on dial 1) **<br>times<br>4 (random # 0-12) **<br>is 4 **<br>is 6 **<br>is 8 ** | nothing<br>nothing<br>2<br>nothing<br>4<br>4 blinks for 2 beats<br>6 blinks for 2 beats<br>8 blinks for 2 beats |

| FUNCTIONAL DIAL | # DIAL 1 | # DIAL 2 | AUDIO | LCD |
|---|---|---|---|---|
| Activator is hit before auto-shut-off | lightning | 4 (Any # 0-12) | (Medium level lightning sound) 2 (random # 0-12) ** times 4 (# on dial 2) ** is 4 ** is 6 ** is 8 ** | nothing 2 nothing 4 4 blinks for 2 beats 6 blinks for 2 beats 8 blinks for 2 beats |
| Activator is hit after correct answer | lightning | 4 (Any # 0-12) | (Jackpot sound) "Yeah" | 8 stops blinking |
| Activator is hit after first incorrect answer | lightning | 4 (Any # 0-12) | (Police Siren) or (Buzzer sound) "Try again!" 2 (random # 0-12) ** times 4 (# on dial 2) ** is 4 ** is 6 ** is 8 ** | nothing nothing 2 nothing 4 4 blinks for 2 beats 6 blinks for 2 beats 8 blinks for 2 beats |
| Activator is hit second after incorrect answer | lightning | 4 (Any # 0-12) | (Police Siren) or (Buzzer sound) "Lemme teach ya!" 2 (random # 0-12) ** times 4 (# on dial 2) ** is 4 ** is 6 ** is 8 ** | nothing nothing 2 nothing 4 nothing 8 |
| Activator is not hit within 2 beats after last possible answer | lightning | 4 (Any # 0-12) | Hit it when you hear the right answer! 2 (random # 0-12) ** times 4 (# on dial 2) ** is 4 ** is 6 ** is 8 ** | nothing 2 nothing 4 4 blinks for 2 beats 6 blinks for 2 beats 8 blinks for 2 beats |

| FUNCTIONAL DIAL | # DIAL 1 | # DIAL 2 | AUDIO | LCD |
|---|---|---|---|---|
| Activator is hit before auto-shut-off | lightning | lightning | (Loud lightning sound).<br>2 (random # 0-12) **<br>times<br>4 (random # 0-12) **<br>is 4 **<br>is 6 **<br>is 8 ** | nothing<br>2<br>nothing<br>4<br>4 blinks for 2 beats<br>6 blinks for 2 beats<br>8 blinks for 2 beats |
| Activator is hit after correct answer | lightning | lightning | (Jackpot sound) "Yeah" | 8 stops blinking |
| Activator is hit after first incorrect answer | lightning | lightning | (Police Siren)<br>or (Buzzer sound) "Try again!"<br>2 (random # 0-12) **<br>times<br>4 (random # 0-12) **<br>is 4 **<br>is 6 **<br>is 8 ** | nothing<br>nothing<br>2<br>nothing<br>4<br>4 blinks for 2 beats<br>6 blinks for 2 beats<br>8 blinks for 2 beats |
| Activator is hit after first incorrect answer | lightning | lightning | (Police Siren)<br>or (Buzzer sound) "Lemme teach ya!"<br>2 (random # 0-12) **<br>times<br>4 (random # 0-12) **<br>is<br>8 ** | nothing<br>nothing<br>2<br>nothing<br>4<br>nothing<br>8 |
| Activator is not hit within 2 beats after last possible answer | lightning | lightning | Hit it when you hear the right answer<br>2 (random # 0-12) **<br>times<br>4 (random # 0-12) **<br>is 4 **<br>is 6 **<br>is 8 ** | nothing<br>2<br>nothing<br>4<br>4 blinks for 2 beats<br>6 blinks for 2 beats<br>8 blinks for 2 beats |
| After 3 seconds of non-activity, loops back to beginning | Any # 0-12 or symbol | Any # 0-12 or symbol | Hit It! (Looping beat in background). | Bottom segment of the character furthest right blinks |

| FUNCTIONAL DIAL | # DIAL 1 | # DIAL 2 | AUDIO | LCD |
|---|---|---|---|---|
| Random Quiz mode chosen | Any # 0-12 or lightning | Any # 0-12 or lightning | (Loud lightning sound) Random Quiz! (Looping beat in background). | Bottom segment of the character furthest right blinks |
| No activity for 3 seconds | Any # 0-12 or lightning | Any # 0-12 or lightning | Hit It! (looping beat in background). | Bottom segment of the character furthest right blinks |
| No activity for another 3 seconds | Any # 0-12 or lightning | Any # 0-12 or lightning | Hit It! (looping beat in background). | Bottom segment of the character furthest right blinks |
| No activity for another 3 seconds | Any # 0-12 or lightning | Any # 0-12 or symbol | Hit It or miss it! (looping beat in background). | Bottom segment of the character furthest right blinks |
| No activity for another 3 seconds | Any # 0-12 or lightning | Any # 0-12 or lightning | Auto shutoff. | Nothing |
| Activator is hit before auto-shut-off | 2 (Any # 0-12) | 4 (Any # 0-12) | (Loud lightning sound) Turn a dial to lightning. | Box blinks for 6 beats. |
| Activator is hit again before auto-shut-off | 2 (Any # 0-12) | 4 (Any # 0-12) | (Loud lightning sound) Turn a dial to lightning. | Bottom segment of the character furthest right blinks |
| Activator is hit before auto-shut-off | 2 (Any # 0-12) | lightning | (Medium level lightning sound.) 2 (# on dial 1) ** times WHAT ** is 8 (any multiple of # on dial 1) | nothing 2 nothing [ ] steady nothing 8 |
| Dial 2 is not turned during 1st 6 seconds | 2 (Any #0-12) | lightning | Turn the dial to answer. | 8 |
| Dial 2 is not turned during 2nd 6 seconds (auto shut off after 18 seconds) | 2 (Any #0-12) | lightning | Turn the dial to answer | 8 |

FIG._4H

| FUNCTIONAL DIAL | # DIAL 1 | # DIAL 2 | AUDIO | LCD |
|---|---|---|---|---|
| Dial 2 is turned to correct # and activator is hit with 6 seconds | 2 | 4 | (Jackpot sound) "Yeah" | 8 |
| Dial 2 is turned to incorrect # and activator is hit within 1st 6 seconds | 2 | 5 (wrong #) | (Police Siren) or (Buzzer sound) Try again! (repeat equation!) | 8 |
| Dial 2 is turned to incorrect # and activator is hit within 2nd 6 seconds | 2 | 5 (wrong #) | (Police Siren) or (Buzzer sound) Lemme teach ya! 2 times 4 is 8. | 8 |
| Dial 2 is turned and activator is not hit within 1st 6 seconds | 2 | Any #0-12 or lightning | Hit It! | 8 |
| Dial 2 is turned and activator is not hit within 2nd 6 seconds | 2 | Any #0-12 or lightning | (Referees whistle) or (Explosion) "Out of time" 2 times 4 is 8. | nothing nothing 2 nothing 4 nothing 8 |
| Activator is hit before auto-shut-off | lightning | 4 (Any #0-12) | (Medium level lightning sound.) WHAT** times 4 (# on dial 2)** is 8 (any multiple of # on dial 2) | 8 [ ] steady nothing 4 nothing 8 |
| Dial 1 is not turned during 1st 6 seconds | lightning | 4 (Any #0-12) | Turn the dial to answer | 8 |

FIG._4I

| FUNCTIONAL DIAL | # DIAL 1 | # DIAL 2 | AUDIO | LCD |
|---|---|---|---|---|
| Dial 1 is not turned during 2nd 6 seconds (auto shut off after 18 seconds) | lightning | 4 (Any #0-12) | Turn the dial to answer | 8 |
| Dial 1 is turned to correct # and activator is hit with 6 seconds | 2 | 4 | (Jackpot sound) "Yeah" | 8 |
| Dial 1 is turned to incorrect # and activator is hit within 6 seconds | 3 (wrong #) | 4 | (Police Siren) or (Buzzer sound) Try again! (repeat equation) | 8 |
| Dial 1 is turned to incorrect # and activator is hit within 2nd 6 seconds | 3 (wrong #) | 4 | (Police Siren) or (Buzzer sound) "Lemme teach ya!" 2 times 4 is 8 | 8 |
| Dial 1 is turned and activator is not hit within 1st 6 seconds | Any # 0-12 or lightning | 4 | Hit It! | 8 |
| Dial 1 is turned and activator is not hit within 2nd 6 seconds | Any # 0-12 or lightning | 4 | (Referees whistle) "Out of time" or (Explosion) 2 times 4 is 8 | nothing nothing 2 nothing 4 nothing 8 |
| Activator is hit before auto-shut-off | lightning | lightning | (Loud lightning sound) WHAT** times WHAT** is 8 (common multiple of dial #1 and 2) | Nothing [ ] steady nothing [ ] steady nothing 8 |

| FUNCTIONAL DIAL | # DIAL 1 | # DIAL 2 | AUDIO | LCD |
|---|---|---|---|---|
| Neither dial is turned during 1st 6 seconds | lightning | lightning | Turn the dials to answer | 8 |
| Neither dial is turned during 2nd 6 seconds (auto-shut-off after 18 seconds) | lightning | lightning | Turn the dials to answer | 8 |
| Dials 1 and 2 are turned to correct #s and activator is hit with 6 seconds | 2 | 4 | (Jackpot sound) "Yeah" | 8 |
| Dials 1 or 2 are turned to incorrect #s and activator is hit within 6 seconds | 2 | 5 (wrong #) | (Police Siren) or (Buzzer sound) Try again! (repeat equation) | 8 |
| Dial 1 or 2 is turned and activator is not hit within 1st 6 seconds | 2 | 5 (wrong #) | Hit It! | 8 |
| Dial 1 or 2 is turned and activator is not hit within 2nd 6 seconds | 2 | Any # 0-12 or lightning | (Referees whistle) "Out of time" or (Explosion)<br>2<br>times<br>4<br>is<br>8 | nothing<br>nothing<br>2<br>nothing<br>4<br>nothing<br>8 |
| Activator is not hit within 6 seconds | 2 | Any # 0-12 or lightning | (Referees whistle) or (Explosion) "Out of time"<br>2<br>times<br>4<br>is<br>8 | nothing<br>nothing<br>2<br>nothing<br>4<br>nothing<br>8 |
| After 3 seconds of non-activity, loops back to beginning | Any # 0-12 or symbol | Any # 0-12 or symbol | Hit It! (Looping beat in background). | Bottom segment of the character furthest right blinks |
| SCORING GAMES 2 & 3 | | | | |

| FUNCTIONAL DIAL | # DIAL 1 | # DIAL 2 | AUDIO | LCD |
|---|---|---|---|---|
| After 5 correct answers in a row (1st chance, not 2nd) | Any # 0-12 or symbol | Any # 0-12 or symbol | 5 in row! Small crowd cheering | |
| After 10 correct answers in a row (1st chance, not 2nd) | Any # 0-12 or symbol | Any # 0-12 or symbol | 10 in a row! Medium crowd cheering | |
| After 20 correct answers in a row (1st chance, not 2nd) | Any # 0-12 or symbol | Any # 0-12 or symbol | 20 in a row! Large crowd cheering | |
| After 5 answers (0/5 - 2/5) | Any # 0-12 or symbol | Any # 0-12 or symbol | X out of 5. Keep trying! | |
| After 5 answers (3/5 - 4/5) | Any # 0-12 or symbol | Any # 0-12 or symbol | X out of 5. Sound X! | |
| After 10 answers (0/10 - 6/10) | Any # 0-12 or symbol | Any # 0-12 or symbol | X out of 10. Keep trying! | |
| After 10 answers (7/10 - 9/10) | Any # 0-12 or symbol | Any # 0-12 or symbol | X out of 10. Sound X! | |
| After 20 answers (0/20 - 15/20) | Any # 0-12 or symbol | Any # 0-12 or symbol | X out of 20. Keep trying! | |
| After 20 answers (16/20 - 19/20) | Any # 0-12 or symbol | Any # 0-12 or symbol | X out of 20. Sound X! | |

NOTES:
1) Each beat is 500 ms
2) For function 2, there must be two wrong answers (total, not necessarily in a row) OR two timeouts (total, not necessarily in a row) before the answer is displayed. If a wrong answer is followed by a timeout or vice versa, this is considered one occurrence of each.

MATHEMATICAL LEARNING GAME AND METHOD

FIELD OF THE INVENTION

The invention relates generally to learning games and more particularly to toys and games designed to teach arithmetic.

BACKGROUND OF THE INVENTION

It is important that children develop basic arithmetical skills at an early age. Children in the age range of four to five are generally expected to be able to count to one-hundred by the end of kindergarten. In between kindergarten and second grade, children are expected to learn how to add and subtract. By the end of third grade, children are commonly expected to learn basic multiplication skills.

It is desirable to have learning games and toys that reinforce basic arithmetical skills. Flash cards are one common technique to teach children how to add, subtract, multiply, and divide numbers. The exact beginning of the use of flash cards as an educational method is not known, but is probably at least a hundred years old. Variations on flash cards, such as writing questions and answers on a piece of slate, may be even older. Flash cards commonly have an arithmetic question printed on one side (e.g., "2 +2=?") and an arithmetical answer printed on the other side (e.g., "4").

It is well known that traditional flash cards are a comparatively poor learning method for many small children. One problem is that small children typically have an extremely limited attention span (e.g., less than five minutes for pre-school children). Consequently, small children may become easily bored with traditional flash cards. There have been many attempts to improve upon the concept of flash cards as a means to instruct children in basic mathematical concepts. In particular, a stack of flash cards can be replaced with a mechanical device having a plurality of numbered wheels or switch matrices which replicates the function of a traditional flash card. A variety of mechanical devices, for example, permit a user to input "2+2=" with one set of rotary dials and then to press a mechanical button to view the answer on another rotary dial.

However, merely replicating the function of traditional flash cards would not be expected to substantially improve the efficacy of the learning process compared with conventional flash cards. Small children have special educational needs which are not addressed merely by electronically or mechanically replicating the same function as conventional flash cards.

Conventional flash cards are almost exclusively a visual learning tool. However, children learn new skills by a variety of methods. Learning theorists classify children into three basic types: visual learners, auditory learners, and kinesthetic learners. Some children are primarily visual learners. Visual learners learn best by having visual cues, such as written text or symbols. Some children are primarily auditory learners. Auditory learners respond best to sounds, music, and speech. Some children are primarily kinesthetic learners. Kinesthetic learners respond best to motion, movement, and action-oriented learning. Although children usually have a primary learning modality, most children learn best when instructed with a combination of all three of these modalities.

Arithmetical learning, in particular, often requires a combination of learning modalities. In order to develop a so-called "number sense" children need to learn to associate abstract numbers with real-world objects. Teachers sometimes start with the physical manipulation of physical objects (e.g., "two apples plus two apples is how many apples?") as a pathway to developing an intuitive understanding of adding abstract numbers (e.g., "what is two plus two?").

Generally, active learning involving multiple learning modalities is superior to a single learning modality. Kindergarten teachers, for example, often use a variety of techniques to maintain the attention of small children. The number system, for example, may be taught by visually showing the numbers. Physical games, such as handing out apples to teach addition and subtraction, invokes kinesthetic modalities. Also, spoken words and songs (e.g., counting songs in which the number of people or animals is recited in tune to music) induces auditory learning modalities.

Learning is also facilitated by interactive learning. For example, classroom teachers sometimes use random quizzing to maintain the attention of the child. Additionally, entertaining games which maintain the attention of the child facilitate a child's learning.

Effective learning is also facilitated by providing emotional support and encouragement. Classroom teachers provide praise for correct answers and patient encouragement for children having difficulty grasping new facts or concepts.

Conventional flash cards, which are predominately a visual learning tool, may be ineffectual for children who are primarily auditory or kinesthetic learners. Also, conventional flash cards do not also address the emotional needs of small children.

Personal computers may be programmed with mathematical games that teach arithmetic skills. The size and cost of conventional personal computers, however, may price them out of the reach of many parents. Also, the comparatively large physical size and fragility of conventional personal computers may limit the extent to which unsupervised play by a small child is acceptable. For example, parents are unlikely to hand over an expensive (e.g., $500 to $1000) multipurpose home laptop computer filled with important family records to a small child for unsupervised play. Conventional laptop computers are not designed to take substantial amounts of punishment from small children, such as being repeatedly dropped. Also, a conventional laptop computer may be too bulky and heavy for a small child to conveniently carry and play with in many situations, such as in a car or in a school bus.

Moreover, commonly used mouse and track-ball designs do not provide a strong kinesthetic learning modality. A conventional mouse or track-ball is designed to permit an adult to rapidly insert inputs into a computer. A conventional mouse or track-ball is not designed to assist a child to gain a strong understanding of arithmetical relationships by invoking a strong kinesthetic learning modality. "Pointing and clicking" at objects on a computer screen with a conventional mouse invokes mainly visual learning modalities. Thus, while a conventional personal computer may be programmed with arithmetic games, it does not provide the desired combination of simultaneously strong kinesthetic, auditory, and visual learning modalities which children need to rapidly learn arithmetic.

An arithmetical learning tool that combines the visual learning mode of conventional flash cards with auditory and kinesthetic learning modes as part of an engaging, interactive game is highly desirable. However, no previously known learning toy combines all three learning modalities into a fun, interactive game specifically designed to teach children basic arithmetic skills.

What is desired is a multiple learning modality arithmetical game and method designed to aid small children in mastering basic arithmetic.

SUMMARY OF THE INVENTION

The present invention is a learning game with multiple instructional modalities which combine auditory, visual, and kinesthetic stimulation to teach arithmetic to children. The physical apparatus of the present invention comprises a housing, an electronic control and memory unit disposed in the housing, a matrix switch for providing numerical inputs to the control unit, an electronic numerical display for providing a visual display of numbers, a sound synthesizer and speaker for providing audio outputs from the control and memory unit, and a response switch for ting simple responses to the game, such as answers to yes/no questions. The present invention implements at least one pedagogical modality related to a first number and a second number by utilizing a plurality of instructional modalities.

In one embodiment, the present invention comprises a substantially cylindrical housing dimensioned to be readily grasped by a child. The matrix switch preferably comprises two rotary dials disposed on the circumference of the cylinder. A separate response switch at one end of the cylinder provides a means for a child to input responses. In the preferred embodiment, the game has three pedagogical modes, including a teach mode, quiz mode, and random quiz mode. Each pedagogical mode is comprised of a plurality of instructional modes, such as declarative statements, interrogative statements, inviting statements, and feedback statements.

BRIEF DESCRIPTION OF THE DRAWINGS

FIG. 1 is a side view of a preferred embodiment of an ergonometric learning game of the present invention.

FIG. 2 is a block diagram of the electronic function of the physical apparatus of the present invention.

FIGS. 3A–3B show is a circuit schematic of a circuit which implements the electronic function of the present invention.

FIGS. 4A–4K are a summary of script commands used to program an embodiment of the present invention used to teach multiplication.

DETAILED DESCRIPTION OF THE INVENTION

The present invention comprises an electronic mathematical learning game designed to simultaneously utilize visual, auditory, and kinesthetic instructional modalities as part of a pedagogical modality.

As used in this application, an instructional modality corresponds to instructions which occur between consecutive user inputs. It corresponds to one or more lines of script code, such as shown in FIG. 4. For example, an instructional modality may comprise an auditory interrogative statement (e.g., "two plus two is what?") in combination with a flashing numerical display indicating the numbers as they are recited. As another example, an instructional modality may comprise a declarative statement (e.g., "two plus two is four") in combination with a flashing numerical display. An instructional modality may also comprise emotionally supportive or encouraging statements (e.g., "Yeah!").

Generally, a pedagogical modality is a learning strategy designed to instruct a child and which includes several user inputs or responses as part of the game. Pedagogical modalities include statements, interrogative quizzes, and random interrogatories wherein answers to the interrogatives preferably require use of recognition and recall. For example, a pedagogical modality may comprise an interrogative statement, emotional encouragement, and positive feedback as part of a quiz. For example, a quiz may have an instructional modality which comprises an interrogative statement (e.g., "two plus two is what?"). The quiz may also have an instructional modality which is a declarative statement to provide emotional encouragement if the child responds with an incorrect answer (e.g., "try again!"). The quiz may also have an instructional modality which is a declarative statement of instruction after a series of wrong answers by the child (e.g., "Let me teach you. Two plus two is four!").

One aspect of the present invention is an ergonometric physical apparatus which may be programmed with pedagogical modalities comprising instructional modalities which provide strong auditory, visual, and kinesthetic stimulation. In this application, a game is ergonometric if it is designed to be compact, portable, and easily manipulated by a child such that it fosters multi-modal learning. As shown in the embodiment of FIG. 1, one embodiment of the present invention comprises a housing 50, a speaker 60, a visual display 70, a first number dial 80, a second number dial 90, a user game mode switch 100, and a touch response switch 110. The touch response switch l110 is an activator switch which provides a convenient method for the user to input responses to questions by hitting the touch response switch 110. Additional finger grips 120 may be disposed on either end of the housing 50 to facilitate a child's hand grip.

The number dials 80 and 90 are coupled to rotary multi-position switches in the housing 50 of the game. A variety of rotating multi-position switches are commonly used in the electronics industry such that those of ordinary skill in the art of electronic toys are presumed familiar with the internal operation of rotary multi-position switches. The rotatable number dials 80 and 90 function as a matrix switch. The two multi-position rotary switches underneath the number dials 80 and 90 may be used, using well-known techniques, to convert the switch position into digital inputs for a control unit.

The embodiment shown in FIG. 1 is compact and designed to invoke strong kinesthetic, auditory, and visual learning modalities. Preferably, the housing 50 is a generally tubular structure having a diameter of about two inches and a length of about seven inches. This size, in conjunction with finger grips 120, facilitates a child grasping the game with one hand while manipulating the number dials or hitting the response switch with the other hand. The response switch 110 is preferably palm size, which makes it easy and fun for small children to use. While a generally tubular structure is one embodiment of an ergonometric housing, other ergonometric housing designs and arrangements are within the scope of the present invention. The housing could be designed to be part of a larger toy, such as a toy animal, toy necklace, etc., which contains a speaker, matrix switch, visual display, and response switch. For example, a toy snake could comprise the housing which contains all of the physical elements of the present invention in an ergonometric design. Those of ordinary skill in the art of toy design are presumed familiar with design choices which make it convenient for young children to grasp and manipulate game elements.

The tubular structure of housing 50 also facilitates the use of cylindrical number dials 80 and 90. The number dials have numerical values imprinted upon them which correspond to an electrical switch position. Other symbols, such as a lightening bolt, are included on the number dial 80 or 90. The addition of non-numerical symbols on the number dials has the benefit that it increases the versatility of the game without substantially increasing the complexity of the controls. As described below in more detail, non-numerical symbols are particularly useful for game modes in which the symbol stands for a random number, such as a number in the range of zero-to-twelve. The rotatable dials 80 and 90 preferably have a raised surface, which facilitates a child turning the dials. As described below in more detail, the raised number dials are physically manipulated by the child in order to input mathematical equations and to provide response to quizzes. This use of the dials promotes strong kinesthetic learning modalities. However, other embodiments of a matrix switch which provide a kinesthetic learning modality are within the scope of the present invention. For example, the matrix switch could comprise a rotary switch which is largely contained within the housing. Also, the matrix switch could comprise other types of multi-position switches, such as a slidable element or a rotating knob.

When two numbers on the number dials 80 and 90 are rotated into alignment with a number selector indicator 130, the indicated numbers on the dials are selected. The number selector indicator may be in the form of a mathematical operator such as a "plus", "minus", "multiply" or "divide" sign. For example, the first number dial 80 may have numbers in the range of zero to twelve imprinted upon it. When one of the numbers (e.g., "2") is rotated into alignment with number selector indicator 130, an electronic switch corresponding to the selected number is activated. Similarly, the second number dial 90 may also have numbers in the range of zero to twelve imprinted upon it. When one of the numbers (e.g., "3") is rotated into alignment with number selector indicator 130, an electronic switch corresponding to the selected number is activated. The number selector indicator 130 may also be used to indicate the mathematical operation being performed, such as a number selector indicator 130 in the form of a multiplication sign.

The visual display 70 may comprise a variety of commonly used electronic displays, such as liquid crystal displays (LCD's). As shown in FIG. 1, the display 70 may be located generally along the circumferential surface of the housing 50. However, it is desirable that the display be generally along a common line with the numbers indicated by the number selector indicator 130. As shown in FIG. 1, the selected numbers (here three and four) are colinear with the display 70. An "equals" sign 140 may be included on the surface of case 50 to reinforce the concept that the display 70 may show a mathematical result.

The display 70 is preferably slightly recessed from the surface of the housing 50. As shown in FIG. 1, there may be a recessed region 150 which separates display 70 from the circumference of the tubular housing 50. The location of the display facilitates its durability. If a child drops the learning game, it will tend to land on either first end 160 or second end 170. If the learning game lands along the tubular housing 50, it will tend to strike the raised number dials 80 or 90 or the finger grips 120 rather than directly striking the display 70.

The user game mode switch 100 preferably has several positions such that a variety of game modes may be selected. The ability of the user to select a variety of games which contain distinct pedagogical modes is desirable. However, it is also possible that the game could be programmed to automatically switch between different pedagogical modes based upon the user's performance (e.g., automatically switching from a quiz mode to a teach mode if the user makes too many mistakes). A variety of switch designs are possible. However, a rotatable dial with at least four settings is a preferred design to permit an "off" mode, "learn" mode, "quiz" mode, and "random quiz" mode.

The touch switch 110 may be located at a variety of positions on housing 50. However, as shown in FIG. 1, preferably touch response switch 110 is located at a second end 170 of the tubular casing 50. This facilitates a child hitting touch response switch 110 with the palm of their hand. This makes it easy and fun for a child to input answers to questions.

Speaker 60 may be disposed at a variety of locations on housing 50. However, preferably speaker 60 is located at first end 160 of tubular housing 50. This facilitates using a comparatively inexpensive speaker 60 with an approximately 2' diameter. The housing 50 may be reinforced and supplied with appropriate sound holes for speaker 60 disposed at first end 160 of tubular housing 50.

The interior of the housing 50 contains a control unit, memory unit, and speech synthesizer. Preferably, the memory unit (or its implementation in part of a larger circuit) is capable of being programed to store several pedagogical modalities, each having a plurality of instructional modalities.

The preferred embodiment of the present invention shown in FIG. 1 may be altered somewhat to achieve the same learning function. However, if the structure was made excessively large (e.g., twice its preferred size, or a cylinder with a diameter of greater than about four inches and a length greater than about fourteen inches) it might be difficult for a small child to grasp the game with one hand while manipulating dials or hitting a response switch with the other hand. Thus, the embodiment shown in FIG. 1 should have a diameter less than about four inches and a length less than about fourteen inches.

An ergonometric learning game preferably is sized such that it invokes strong kinesthetic learning modalities among children. The number dials may be replaced with push button switches. However, rotating dials are preferred since they invoke a strong kinesthetic learning modality. It is also preferred that the rotating dials and the numerical display be aligned in accord with a standard mathematical equation (e.g., the numerical indicator, selected numbers, and visual display are along a common longitudinal line along the length of the housing). This helps to faster an understanding of mathematical concepts.

There are three main ways in which the invention may be used by the child. In teach mode, the game teaches a child mathematical relationships primarily by example. Consider for example, the invention configured to teach addition. If a child rotates the first number dial to five, the second number dial to eight, and presses the response switch, the learning toy will say "five plus eight is thirteen" to a catchy background beat. Synchronously with the voice, the game flashes the numbers "five", "eight", and "thirteen" on the numerical display. The game also says an emotionally supportive statement, such as "yeah" after reciting the entire equation. The game then says an inviting statement, "hit it or miss it" to encourage the child to play more. The wild card symbols (lightening bolts) on the number dials may also be chosen, resulting in the game looping through a series of numbers (e.g., going through all of the number possibilities from zero to twelve). Additionally, a child may turn a number dial to a lighting bolt symbol, which as previously described, will cause the game to loop through combinations of numbers corresponding to all possible number variations (e.g., zero to twelve) for the lightening bolt position. The teach mode is particularly well suited as a pedagogical modality for developing recognition memory regarding basic arithmetical relationships.

In a quiz mode of the preferred embodiment, a child rotates the number dials to particular values, for example, three and five. The game then challenges the child to "hit it when you hear the right answer." The game then says the problem, "three plus five is what?" to a catchy beat. The game then states and flashes a series of answers (e.g., one, four, eight). The child may hit the response switch to signify an answer. For a correct answer, a positive feedback statement is supplied. If the answer is wrong, an emotionally supportive statement (e.g., "try again") is supplied. If the child continues to make mistakes, the game automatically converts back into a tutorial mode to teach the child the correct answer. The quiz mode is particular useful as part of a pedagogical modality designed to reinforce recognition memory.

In random quiz mode, the game provides the child with the correct resultant answer and one of the inputs but asks the child to provide the other input. For example in random quiz mode, the game may ask "two plus what is six?" As in other game modes, the numerical display reinforces the oral message, except that the "what" of the auditory instruction is reinforced with a pair of empty brackets. In order for the child to respond in random quiz mode, the child rotates one of the number dials to the correct number and presses the response switch. The "wild card" lightening bolt symbols on at least one of the numbers is rotated into alignment with indicator 130 prior to random quiz mode. This indicates to the child that the dial with the lightening bolt symbol is the dial to which the "what" part of the question refers. In random quiz mode the dial with the lightening bolt is rotated to indicate the correct answer (e.g., if one number dial is set to the lightening bolt symbol and then the other is set to two, the game says "what plus two is five." The child may then turn the dial which originally; had the lighting bolt to three and press the response switch). Random quiz mode is a pedagogical mode which develops recall memory.

A block diagram of the electronic function of the learning game of the present invention is shown in FIG. 2. A control unit 5 may comprise commonly used control circuits, such as one or more microprocessors. An additional memory unit 10, capable of storing programmed pedagogical modalities and instructional modalities, may be connected to control unit 5 or, in some cases, be part of control unit 5. The control unit 5 preferably is programmed with at least one pedagogical modality and a plurality of instructional modalities. A speech synthesizer 15 receives voice control signals from control unit 5 and converts them to audio signals which may be received as an input by speaker 20 and broadcast as an audio output by speaker 20. The speech synthesizer 15 and speaker 20 provide voice instructions, questions, voice encouragement, and rhythmic music. As is well known by those of ordinary skill in the art of electronics, the memory, control, and speech synthesizer functions may be achieved in one or more semiconductor chips, such as a microprocessor chip capable of a control function and also having a programmable memory capability. Also, those of ordinary skill in the art of electronic toys are presumed familiar with a variety of sound transducers which perform the function of a speaker.

A visual display 25 receives numerical control inputs from control unit 5 and converts them into a visual display. The visual display may display numbers, blank braces, or question marks. However, it could also comprise other visual representations, such as a visual depiction of objects, such as apples, to signify numbers. A mathematical problem (e.g., two numbers which are to be operated upon) is input into a matrix switch input 30. In one embodiment, matrix switch input 30 could, for example, comprise a plurality of switches which would permit two different numbers to be input to control unit 5. An activator switch 35 permits a user to provide responses to the control unit. A game mode input 40 allows a user the ability to choose a pedagogical modality of control unit 5.

The present invention provides a variety of pedagogical and instructional modalities. The visual display 25 provides a means for visual representations of numbers to be displayed to reinforce auditory questions (e.g., the voice synthesizer may say "2+3=" while the visual display synchronously flashes the numbers two and three). The activator switch 35 permits the user yes/no answers to questions posed by the learning game.

Those of ordinary skill in the art of electronic toys are presumed familiar with a variety of microprocessor or other logic circuits which implement the function of a speech synthesizer, memory unit, and control unit which are also compact enough to fit inside the ergonometric casing 50 of the present invention. A circuit used to implement the electronic function in one embodiment of the present invention is shown in FIGS. 3A and 3B.

The present invention teaches a child mathematics as part of an entertaining game that is designed and structured to promote multiple learning modalities. The small size and ergonometric design facilitates a child grasping the toy in their hands. A strong kinesthetic learning modality is invoked by having the child rotate the number dials to select particular number choices. A strong visual learning modality is invoked as the numerical display flashes or otherwise displays numbers. A strong auditory learning modality is also invoked by declarative and interrogative auditory statements.

The auditory statements are structured to maintain the interest of a child. The auditory statements utilize rhythmic background music to create a "catchy beat." In one embodiment, the auditory statements are not spoken in a cold mechanical voice but with a "cool voice with attitude."

Additional auditory statements are included which are designed to provide emotional encouragement. Positive feedback statements, such as "Yeah", "Awesome", "Super", etc., are used to reward correct answers. Emotionally supportive statements, such as "try again" are provided in response to incorrect answers. In response to a succession of wrong answers (or a failure to answer) the game says "Let me teach you" and then in a friendly tone of voice provides the child with the correct answer. There are also inviting statements, such as "Hit it or miss it" and "Hit it when you hear the right answer" which encourage a child to continue with the game.

The pedagogical and instructional learning modalities may easily be used for addition, subtraction, division, and multiplication. FIG. 4, which because of the long length of the table is labeled sequentially as FIGS. 4A–4K, is a list of script commands for a multiplication game of the present invention. There are three distinct pedagogical modalities corresponding to a teach mode, quiz mode, and random quiz mode. Similar script commands can be used for addition, subtraction, and division. Many variations of the script commands are within the scope of the present invention. However, the script commands of FIG. 4 describe a preferred embodiment of a learning game in which visual, auditory, and kinesthetic learning modalities mutual reinforce one another in a synergistic fashion. For example, in an addition game, visually flashing the numbers while they are spoken by the voice synthesizer reinforces a child's recognition of the number. Rotating the number dials provide kinesthetic and visual reinforcement of the equation.

As indicated by the script commands of FIG. 4, each pedagogical modality comprises a plurality of instructional modalities. In teach mode the child lines up numbers on the rotatable dials along the number selector 130 and then presses the response switch to see and hear the correct answer. Teach mode has declarative statements, a rhythmic looping beat, and visual display of numbers as one instructional modality comprising declarative statements. However, inviting statements, such as "Hit it," encourage the child to play more and also encourages kinesthetic stimulation. Also, the child may select a new number combination in teach mode by turning the number dials. Additionally, if the child turns one of the rotating dials to the lighting bolt symbol, the game automatically loops over the range of numbers (e.g., zero-to-twelve), which is another distinct instructional modality. The several distinct instructional modalities of teach mode comprise a pedagogical teaching modality which teaches a child with strong visual, auditory, and kinesthetic stimulation.

The quiz mode is also a pedagogical modality comprised of a plurality of instructional modalities. In quiz mode the child lines up numbers on the rotatable dials along the number selector 130 and then presses the response switch to see and hear the equation question. The child is then given three possible answers, one of which is correct. The child then hits the response switch to indicate which answer is correct, immediately after they hear it. Quiz mode comprises interrogative statements as one instructional modality. Interrogative statements (e.g., "two plus two is what? Hit it when you hear the right answer. One, two, four") are reinforced by the numerical display. However, quiz mode also provides feedback statements (e.g., "yeah!") to correct answers and encouragement statements (e.g., "try again") to incorrect answers as another instructional modality. Also, in response to a series of two incorrect answers, quiz mode automatically changes to a tutorial instructional modality (e.g., "Let me teach you. Two plus two is four!").

The random quiz mode is also a pedagogical modality comprised of a plurality of instructional modalities. In random quiz mode the child lines up equations with one or both lightening bolt symbols numbers of the rotatable dials along the number selector 130 and then presses the response switch to see and hear the equation question. The lightening bolt symbol functions as a "fill in the blank" symbol. After the question, the child turns the number dial(s) to fill in the blank and hits the response switch.

Random quiz mode comprises interrogative statements as one instructional modality. Interrogative statements (e.g., "two plus what is six? Turn the dial to answer"). However, turning the dial to the correct answer and pressing the response switch is another distinct instructional modality which is highly kinesthetic in nature. Also, random quiz mode also provides feedback statements (e.g., "yeah!") to correct answers and encouragement statements (e.g., "try again") to incorrect answers as another instructional modality. Also, in response to a series of two incorrect answers, random quiz mode automatically changes to a tutorial instructional modality (e.g., "Let me teach you. Two plus four is six!").

The instructional modalities of FIG. 4 may be varied substantially. For example, the words and phrases may be adjusted to meet the needs of children of different ages. Also, the images displayed on the display screen may be adjusted for different ages or to flash emotionally stimulating images (e.g., an image of a firecracker exploding synchronously with the sound of an exploding firecracker to reward a series of correct answers).

Also, as shown in FIG. 4, the feedback statements preferably change with the number of correct (or incorrect) answers given in a row. It is desirable that the game have variety and provide strong praise and/or emotional rewards if the child succeeds in correctly answering a series of questions. In the preferred embodiment of the present invention, there is built-in scoring function by which a child is given stronger praise feedback when they answer a long series of questions correctly in either quiz mode or random quiz mode.

In summary, the inventive educational game teaches arithmetic by a combination of several different pedagogical and instructional modalities. These instructional modalities utilize a combination of visual, kinesthetic, and auditory learning to reinforce a child's understanding of mathematical relationships. The pedagogical modalities of the present embodiment include a teach mode, quiz mode, and random quiz mode. The present invention also utilizes rhythmic music, emotional encouragement, quizzing, and other proven pedagogical techniques as part of the instructional modalities. The present invention thus provides a substantially different learning function compared with conventional flash cards or mechanical devices which merely replicate the function of flash cards. The ergonometric embodiment of the present invention also permits a method of learning which invokes strong kinesthetic learning modalities which cannot be achieved with conventional personal computers.

The description of illustrative embodiments and best modes of the present invention is not intended to limit the scope of the invention. Various modifications, alternative constructions and equivalents may be employed without departing from the true spirit and scope of the appended claims.

What is claimed is:

1. A mathematical learning game comprising:
    a) a housing;
    b) a control and memory unit disposed in the interior of the housing;
    c) a matrix switch coupled to said housing, the matrix switch comprised of a first rotary multi-position electronic switch and a second rotary multi-position electronic switch, the matrix switch providing an input signal to the control and memory unit corresponding to a mathematical operation between a first number or indicia corresponding to a first position of the first rotary multi-position switch and a second number or indicia corresponding to a second position of the second rotary multi-position switch;
    d) an electronic visual display disposed on the surface of the housing and displaying a number or indicia as a function of numerical control signals received from the control unit;
    e) a speech synthesizer and speaker disposed in the interior of the housing and receiving voice control signals from the control unit and producing an audio output; and
    f) an activator switch coupled to the housing for inputting a response to the control and memory unit;
    wherein the control and memory unit implements a pedagogical modality related to the first number or indicia and the second number or indicia, said pedagogical modality comprising a plurality of instructional modalities.

2. The learning game of claim 1, wherein the pedagogical modality comprises a teach mode in which the game provides declarative audio-visual statements on arithmetical operations between the first number and the second number.

3. The learning game of claim 1, wherein the pedagogical modality comprises a quiz mode in which the game provides interrogative audio-visual statements on arithmetical operations between the first number and the second number.

4. The learning game of claim 1, wherein the matrix switch may also be used to input answers to audio-visual interrogative questions.

5. The learning game of claim 4, wherein the pedagogical modality comprises a random quiz mode in which the game provides interrogative audiovisual statements on arithmetical relationships which are answered by inputting numbers on the matrix switch.

6. The learning game of claim 1, wherein at least one instructional modality of said plurality of instructional modalities comprises a positive feedback statement in response to a correct response by the user.

7. The learning game of claim 1, wherein at least one instructional modality of said plurality of instructional modalities comprises at least one emotionally supportive statement in response to an incorrect response by the user.

8. The learning game of claim 1, wherein at least one instructional modality of said plurality of instructional modalities comprises at least one inviting statement to encourage the user to play.

9. A mathematical learning game comprising:
 a) a substantially cylindrical housing having a first end and a second end, the housing dimensioned to be held by a child;
 b) a control and memory unit disposed in the interior of the housing;
 c) a matrix switch coupled to said housing, the matrix switch comprised of a first rotary multi-position electronic switch and a second rotary multi-position electronic switch, the matrix switch providing an input signal to the control and memory unit corresponding to a mathematical operation between a first number or indicia corresponding to a first position of the first rotary multi-position switch and a second number or indicia corresponding to a second position of the second rotary multi-position switch;
 d) an electronic visual display disposed on the surface of the housing and numbers or indicia as a function of numerical control signals received from the control and memory unit;
 e) a speech synthesizer disposed in the interior of the housing, the speech synthesizer receiving voice control signals from the control and memory unit and producing audio signal outputs;
 f) a sound transducer disposed generally in the first end of the housing, the sound transducer receiving audio signal inputs from the output of the speech synthesizer and producing an audio output; and
 g) an activator switch coupled to the second end of the housing for inputting a response to the control and memory unit;
wherein the control and memory unit implements a pedagogical modality related to the first number or indicia and the second number or indicia, said pedagogical modality comprising a plurality of instructional modalities.

10. The learning game of claim 9, wherein the pedagogical modality comprises a teach mode in which the game provides declarative audio-visual statements on arithmetic operations between the first number and the second number.

11. The learning game of claim 10, wherein the pedagogical modality comprises a quiz mode in which the game provides interrogative audio-visual statements on arithmetic operations between the first number and the second number.

12. The learning game of claim 9, wherein the matrix switch may also be used to input answers to audio-visual interrogative questions.

13. The learning game of claim 12, wherein the pedagogical modality comprises a random quiz mode which the game provides interrogative audiovisual statements on mathematical relationships which are answered inputting numbers on the matrix switch.

14. The learning game of claim 9, wherein at least one instructional modality of said plurality of instructional modalities comprises a positive feedback statement in response to a correct response by the user.

15. The learning game of claim 9, wherein at least one instructional modality of said plurality of instructional modalities comprises an emotionally supportive statement in response to an incorrect response by the user.

16. The learning, game of claim 9, wherein at least one instructional modality of said plurality of instructional modalities comprises an inviting statement to encourage the user to play.

17. An ergonometric hand held mathematical learning game comprising:
 a) a substantially cylindrical housing having a first end and a second end, the cylindrical housing having a diameter less than about four inches and a length less than about fourteen inches;
 b) finger grips disposed on the first end and the second end of the cylindrical housing;
 c) a control and memory unit disposed in the interior of the housing;
 d) a matrix switch coupled to the housing, the matrix switch comprised of a first rotary multi-position electronic switch and a second rotary multi-position electronic switch, the matrix switch providing an input signal to the control unit corresponding to a mathematical operation between a first number corresponding to a first position of the first rotary multi-position switch and a second number corresponding to a second position of the second rotary multi-position switch;
 e) an electronic visual display disposed on the surface of the housing and number or indicia as a function of numerical control signals from the control and memory unit;
 f) a speech synthesizer disposed in the interior of the housing, the speech synthesizer receiving voice control signals from the control and memory unit and producing audio signal outputs;
 g) a sound transducer disposed generally in the first end of the housing, the sound transducer receiving audio signal inputs from the output of the speech synthesizer and producing an audio output; and
 h) a pressure-sensitive response switch coupled to the second end of the housing for inputting a response to the control and memory unit, said response switch having a substantially palm-sized contact surface;
whereby the control and memory unit implements a pedagogical modality related to the first number and the second number, said pedagogical modality comprising a plurality of instructional modalities.

18. The learning game of claim 17, wherein the pedagogical modality comprises a teach mode in which the game provides declarative audio-visual statements on arithmetic operations between the first number and the second number.

19. The learning game of claim 17, wherein the pedagogical modality comprises a quiz mode in which the game provides interrogative audio-visual statements on arithmetic operations between the first number and the second number.

20. The learning game of claim 17, wherein the matrix switch may also be used to input answers to audio-visual interrogative questions.

21. The learning game of claim 20, wherein at least one instructional modality of said plurality of instructional modalities comprises a random quiz mode in which the game provides interrogative audiovisual statements on arithmetical relationships which are answered inputting numbers on the matrix switch.

22. The learning game of claim 17, wherein at least one instructional modality of said plurality of instructional modalities comprises a positive feedback statement in response to a correct response by the user.

23. The learning game of claim 17, wherein at least one instructional modality of said plurality of instructional modalities comprises an emotionally supportive statement in response to an incorrect response by the user.

24. The learning game of claim 17, wherein at least one instructional modality of said plurality of instructional modalities comprises an inviting statement to encourage the user to play.

25. A method to teach arithmetical relationships between two numbers comprising the steps of:
   a) providing a toy having a speech synthesizer, a visual display, a matrix switch comprised of a first rotary multi-position electronic switch and a second rotary multi-position electronic switch, and at least one user input response switch;
   b) stating a mathematical operation between two numbers in which the voice instructions of the speech synthesizer are accompanied by a rhythmic beat, the mathematical value of said two numbers being a function of a first position of said first rotary multi-position switch and a second position of said second rotary multi-position switch;
   c) providing synchronous visual symbols on the visual display which visually reinforce the mathematical operation described by the voice instructions; and
   d) requesting that the user provide an input to the response switch.

26. The method of claim 25, further comprising the step of providing emotional encouragement.

27. The method of claim 25, further comprising the step of inviting the user to play again.

28. The method of claim 25, further comprising the step of providing feedback on the user's response to a question.

29. The method of claim 25, further comprising the step of asking the user to provide an input to the matrix switch.

30. A mathematical learning game comprising:
   a) a housing;
   b) a control unit disposed in the interior of the housing;
   c) a matrix switch coupled to the housing, the matrix switch comprised of a first rotary multi-position electronic switch and a second rotary multi-position electronic switch, the matrix switch providing an input signal to the control unit;
   d) an electronic visual display disposed on the surface of the housing receiving numerical control signals from the control unit;
   e) a speech synthesizer disposed in the interior of the housing configured to produce an audio output as a function of voice control signals received from the control unit; and
   f) an activator switch coupled to the housing for inputting a response to the control unit;
wherein the control unit implements at least one pedagogical modality related to a mathematical operation between a first number and a second number, the mathematical value of the first and the second numbers being a function of a first position of the first rotary multi-position switch and a second position of the second rotary multi-position switch.

31. The mathematical learning game of claim 30, wherein a first rotatable dial is coupled to the first rotary multiposition switch and a second rotatable dial is coupled to the second rotary multiposition switch.

32. The mathematical learning gam of claim 31, wherein the housing has a substantially cylindrical shape and the first and the second rotatable dials rotate around the circumference of the housing.

33. The mathematical learning game of claim 31, wherein the pedagogical modality comprises a teach mode in which the game provides declarative audiovisual statements on an arithmetic operation between the first number and the second number.

34. The mathematical learning game of claim 31, wherein the pedagogical modality comprises a quiz mode in which the game provides interrogative audio-visual statements on arithmetic operations between the first number and the second number.

35. The mathematical learning game of claim 31, wherein the matrix switch may also be used to input answers to audio-visual interrogative questions.

* * * * *